United States Patent
Oross et al.

(10) Patent No.: US 7,090,368 B2
(45) Date of Patent: Aug. 15, 2006

(54) KEY FOR USE IN LOW LIGHT CONDITIONS

(75) Inventors: Glen A Oross, Corvallis, OR (US); Dennis R Esterberg, Philomath, OR (US); Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 47 days.

(21) Appl. No.: 10/133,035

(22) Filed: Apr. 26, 2002

(65) Prior Publication Data
US 2003/0202339 A1  Oct. 30, 2003

(51) Int. Cl.
*F21V 33/00* (2006.01)

(52) U.S. Cl. .......................... 362/84; 362/85; 362/253; 200/311; 200/313; 200/314

(58) Field of Classification Search .................. 362/33, 362/85, 109, 253, 234, 260, 84, 23, 28, 30; 200/310, 313, 314, 311
See application file for complete search history.

(56) References Cited

U.S. PATENT DOCUMENTS

| | | | |
|---|---|---|---|
| 4,322,997 A * | 4/1982 | Anstis ....................... 84/479 A |
| 5,416,674 A * | 5/1995 | Murai ........................... 362/84 |
| 5,477,430 A * | 12/1995 | LaRose ........................ 362/84 |
| 5,669,694 A | 9/1997 | Morton, Sr. |
| 5,815,225 A | 9/1998 | Nelson |
| 5,818,361 A | 10/1998 | Acevedo |
| 5,868,487 A | 2/1999 | Polley et al. |
| 5,936,554 A | 8/1999 | Stanek |
| 6,036,326 A * | 3/2000 | Yoshikawa et al. ........... 362/23 |
| 6,145,992 A | 11/2000 | Wattenburg |
| 6,161,944 A | 12/2000 | Leman |
| 6,179,432 B1 | 1/2001 | Zhang et al. |
| 6,281,812 B1 | 8/2001 | Kim |
| 6,331,083 B1 * | 12/2001 | Harris ......................... 400/493 |
| 6,416,196 B1 | 7/2002 | Lemarchand et al. |
| 6,729,738 B1 * | 5/2004 | Fuwausa et al. .............. 362/84 |
| 2002/0000284 A1 * | 1/2002 | Nishi ........................... 156/82 |
| 2002/0176245 A1 * | 11/2002 | Fuwausa et al. .............. 362/84 |

FOREIGN PATENT DOCUMENTS

DE  29709407  *  2/1997
JP  11-224556  *  8/1999

OTHER PUBLICATIONS

Itronix GoBook MAX Brochure, Prior to Mar. 1, 2002.

* cited by examiner

*Primary Examiner*—Thomas M. Sember

(57) ABSTRACT

A key, which may be used in a user interface, including indicia formed at least in part from UV reactive material.

37 Claims, 3 Drawing Sheets

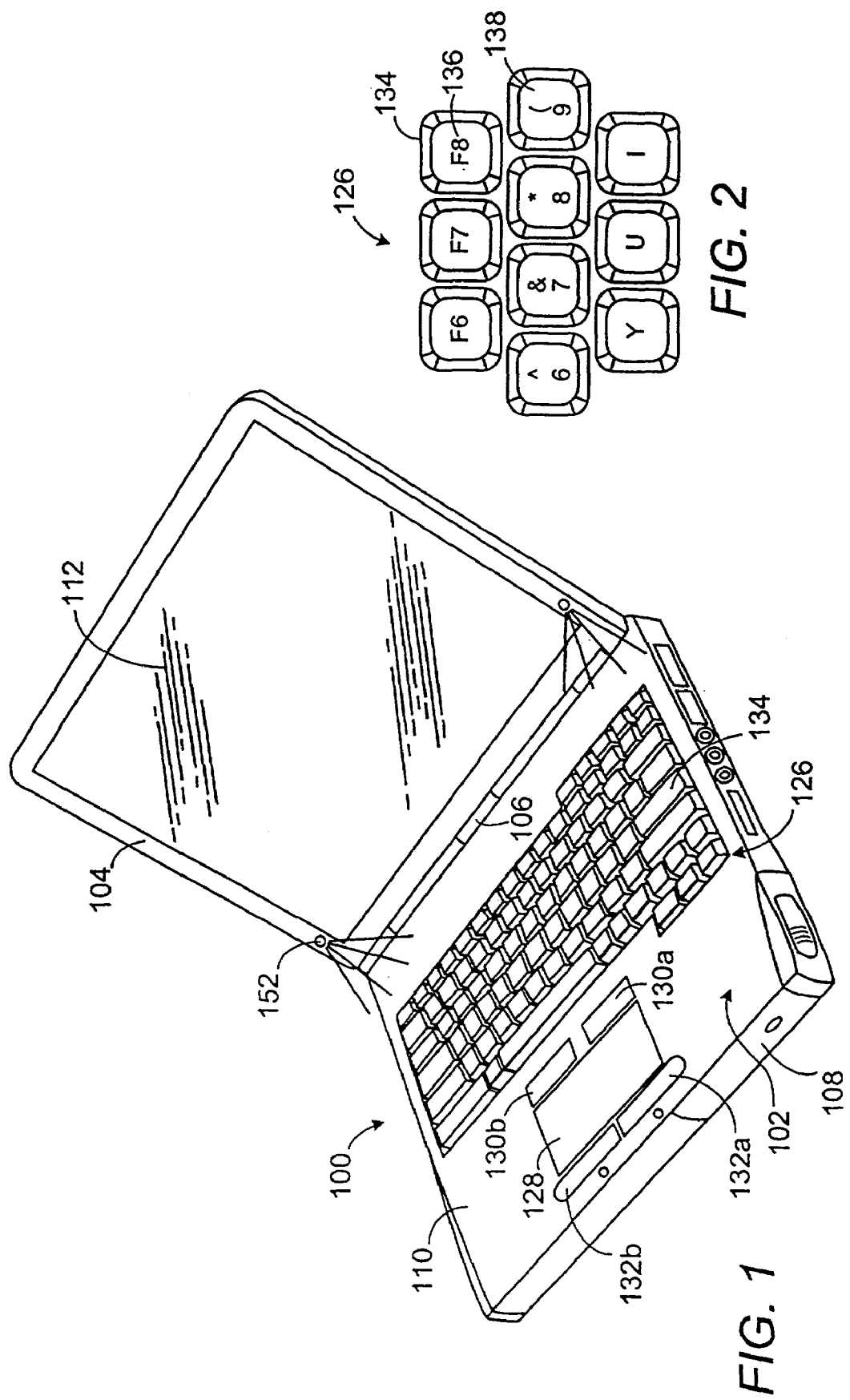

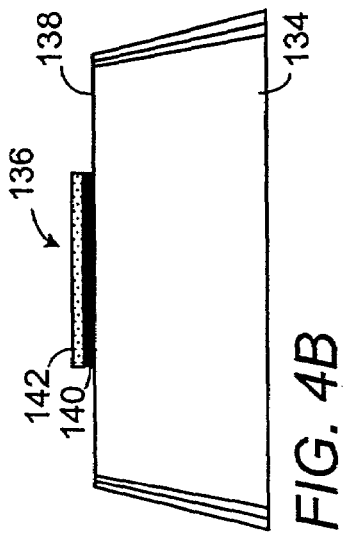
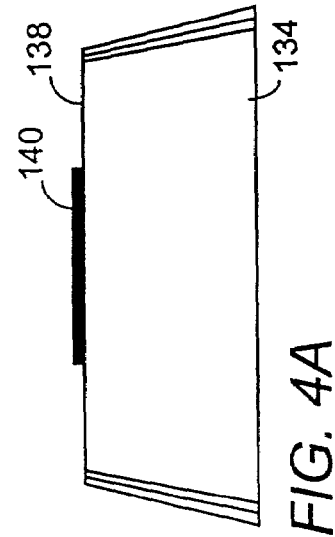
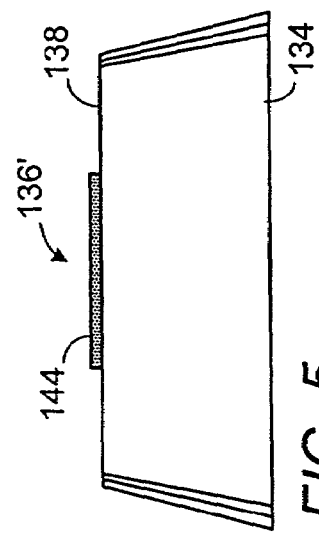
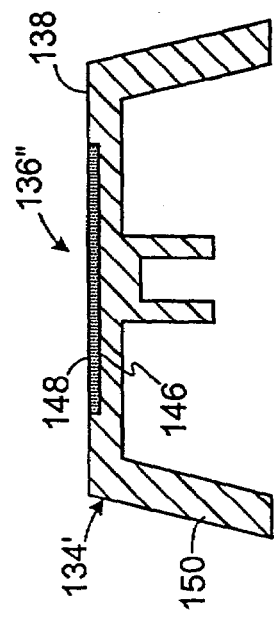
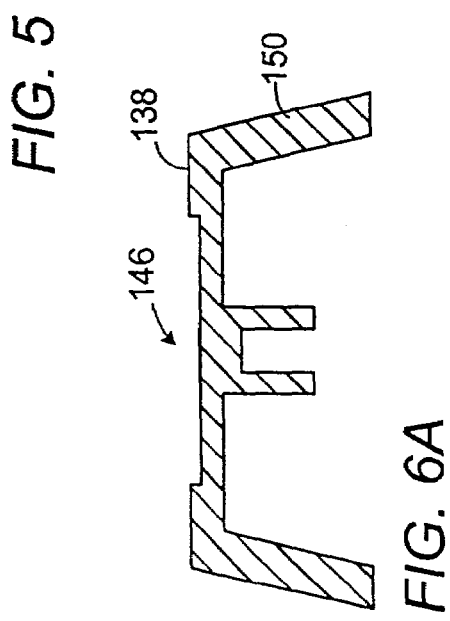
FIG. 4A
FIG. 4B
FIG. 5
FIG. 6A
FIG. 6B

KEY FOR USE IN LOW LIGHT CONDITIONS

BACKGROUND OF THE INVENTIONS

The present inventions are related to user interfaces such as, for example, keyboards.

Many devices include user interfaces. Computers, which allow people to easily perform tasks such as word processing, spreadsheet calculations, database manipulation, e-mail message transmission, internet searches for information, and connecting to networks, are one example of a device that includes a user interface. The fact that computers have become such an integral portion of the average person's life has led to the development of portable computers, such as laptop and notebook computers. Portable computers have proven to be a significant advance because they are relatively small (e.g. about 13 inches wide, 10.5 inches long and 1.5 inches high) and lightweight (i.e. about 5 lbs.). More recently, a variety of hand-held (or palm sized) portable computers have been introduced. As a result, people are able to easily transport portable computers to remote locations where they can perform the same tasks that they could with their relatively immobile desktop computers. Notebooks and other portable computers often include a display and keyboard, as well as click buttons, scroll keys and touch pads that together perform the functions of a mouse.

Portable computers and other devices that include user interfaces may, of course, be operated in a wide variety of environments. The inventors herein have determined that some of the environments in which user interfaces are used, such as airplanes, dimly lit rooms and outdoor areas at night, fail to provide adequate ambient lighting, which makes it difficult for the user to see the user interface (a keyboard in the case of a computer) and work efficiently. As such, the inventors herein have determined that it would be beneficial to provide user interfaces for use in computers (and other devices) that do not rely on ambient light for visibility.

BRIEF DESCRIPTION OF THE DRAWINGS

Detailed description of preferred embodiments of the inventions will be made with reference to the accompanying drawings.

FIG. 1 is a perspective view of a portable computer in accordance with a preferred embodiment of a present invention.

FIG. 2 is a plan view showing a portion of a keyboard in accordance with a preferred embodiment of a present invention.

FIGS. 4A and 4B are side views showing a method of forming indicia on a key in accordance with a preferred embodiment of present invention.

FIG. 5 is a side view showing another method of forming indicia on a key in accordance with a preferred embodiment of present invention.

FIGS. 6A and 6B are side, section views showing another method of forming indicia on a key in accordance with a preferred embodiment of present invention.

DETAILED DESCRIPTION OF THE PREFERRED EMBODIMENTS

Figure 3:
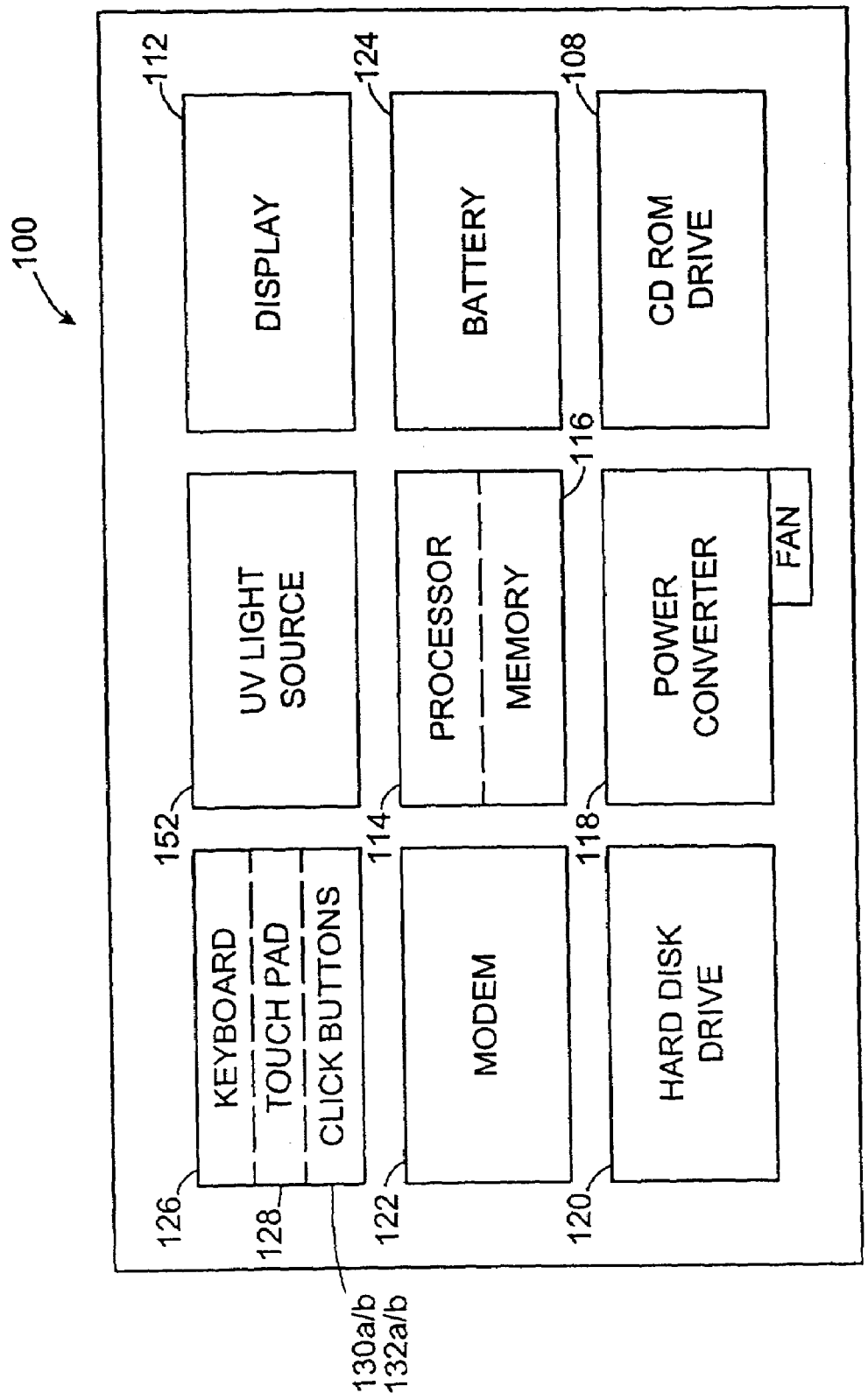
FIG. 3 is a block diagram showing various operating components of a portable computer in accordance with a preferred embodiment of a present invention.

The following is a detailed description of the best presently known modes of carrying out the inventions. This description is not to be taken in a limiting sense, but is made merely for the purpose of illustrating the general principles of the inventions. The present inventions are described below in the context of a portable computer. Nevertheless, the present inventions are not limited to computers or use therewith. Rather, the present inventions are applicable to any device which includes a user interface that may be operated in low ambient light conditions. Additionally, detailed discussions of various conventional internal operating components of computers and keyboards which are not pertinent to the present inventions have been omitted for the sake of simplicity.

Although not limited to any particular type of device that includes a user interface, one embodiment of a present invention is the exemplary notebook style portable computer 100 illustrated in FIGS. 1–3. The exemplary portable computer 100 is, with respect to many of the structural and operating components, substantially similar to conventional portable computers such as the Hewlett-Packard Omnibook 6000 notebook PC. More specifically, the exemplary portable computer 100 includes structural components such as a main housing 102 and a display housing 104 that is pivotably connected to the main housing by a hinge 106. The main housing 102 includes a module bay for optional modules such as the illustrated CD-ROM drive module 108, a 3.5 inch disk drive module, or a ZIP drive module, and a battery bay (not shown). The exemplary main housing 102 is also provided with a user interface 110 that allows the user to interact with the computer 100. The user interface 110 is discussed in greater detail below. In addition to supporting a display 112, the display housing 104 also acts as a lid to cover the user interface 110 when in the closed position. To that end, a conventional latch arrangement (not shown) may be provided to lock the free end of the display housing 104 to the main housing 102 and maintain the display housing in the closed position.

As illustrated in block diagram form in FIG. 3, the operating components of the exemplary computer 100 include a CPU (or "processor") 114, cache and RAM memory 116, a power adapter and fan arrangement 118, a hard disk drive 120, a modem 122, and a battery 124 positioned within the battery bay. The exemplary portable computer 100 may also include other conventional components such as, for example, audio and video cards, headphone and microphone ports, serial, parallel and USB ports, keyboard and mouse ports, a 240-pin PCI connector for docking, an operating system such as Microsoft® Windows, and various application programs such a word processing, spreadsheets, security programs and games.

The user interface 110 in the exemplary computer 100 illustrated in FIGS. 1–3 includes a keyboard 126, a touch pad 128, a first pair of right/left click buttons 130a/130b and a second pair of right/left click buttons 132a/132b. Each of these elements operates in conventional fashion to control the operations of the computer 100 and application programs running thereon. The keyboard 126 includes a plurality of keys 134, each having indicia 136 on the top surface 138 that corresponds to the purpose or function of the key. The top surface 138 may be flat (as shown), concave or convex.

In the exemplary embodiment, the keys 134 consist of alphanumeric keys for each letter of the alphabet and the numerals 0–9, specialized keys such as "enter," "tab" and "backspace" keys, a space bar, function keys, and cursor control keys as well as indicia 136 indicative of theses purposes or functions. Other keys, such as "ctrl" keys and "alt" keys, may also be provided. Exemplary key layouts include the QWERTY layout and the DVORAK layout. It should be noted, however, that the inventions herein are not limited to any particular key layout and keys may be added, removed or rearranged as desired in order to suit particular applications. Additionally, although the indicia 136 on the exemplary keys corresponds to the English language, the indicia may, of course, correspond to the letters and symbols associated with other languages.

The keys 134 in the exemplary implementation may be carried by respective actuators that are mounted on a keyboard base pan. The actuators cooperate with signal generation circuitry (such as flexible membrane circuit positioned a small distance from a relatively immovable circuit) that transmits an appropriate signal when a key is depressed. The keys 134 in the exemplary keyboard 126, which are preferably formed from a relatively hard material such as plastic, are separate structural elements. The present inventions are not, however, limited to any particular key configuration or keyboard configuration. For example, the present inventions are applicable to keyboards which consist of a single flexible membrane that has indicia formed thereon to provide a visual representation of a keyboard layout, such as the keyboard layout illustrated in FIGS. 1 and 2, and a plurality of signal generators respectively located under the indicia representing individual keys. Keys in accordance with the present inventions do not even have to be depressible. Rather, the term "key" is used herein to represent any device or portion thereof which is touched by a user to achieve a particular result (such as generating a signal which indicates that the key has been touched).

The indicia 136 on each key 134 in the exemplary implementation is formed at least in part from material that is reactive to light from the ultraviolet ("UV") portion of the electromagnetic spectrum. UV light is sometimes also referred to as "black light." As used herein, UV reactive material is material that emits light from the visible portion of the electromagnetic spectrum while it is being irradiated with UV light and stops emitting visible light when the UV radiation is removed. Such material is sometimes referred to as "fluorescent material" and visible light is sometimes also referred to as "white light." It should be noted that UV reactive material differs from phosphorescent material in that phosphorescent material absorbs light energy (from many different portions of the electromagnetic spectrum) from a light source, stores the energy, emits visible light, and continues to emit visible light until the energy runs out after the light source has been removed.

Accordingly, even when the keys 134 are used in a dark or dimly lit area, the indicia 136 is visible while it is exposed to UV light because the indicia emits visible light (or "glow"). The exemplary computer 100 (or other device which includes the keys 134) preferably includes its own source of UV light. There are a variety of advantages associated with such an arrangement. For example, the exemplary computer 100 (or other device which includes the keys) may be used in low visible light conditions where operation of the user interface would otherwise be difficult. In addition, the use of UV light does not add to the ambient visible light, which may disturb other people in those instances where the ambient visible light is intentionally low, such as on an overnight airplane flight.

The indicia 136 may be formed in a variety of ways. Although the present inventions are not limited to indicia formed by any particular method, one exemplary method of forming the indicia 136 is illustrated in FIGS. 4A and 4B. A first indicia layer 140 is formed on the top surface 138 of a key 134 in the shape of the character, word or symbol associated with that key (e.g. an "S"). The first indicia layer 140 consists of material that is visible when there is sufficient ambient visible light. In other words, the material reflects visible light in response to the application of visible light. Such materials include the conventional inks typically used to form indicia on computer keys. For example, in those instances where the exterior of the keys (or at least the top surface 138) is black, white ink may be used to form the first indicia layer 140.

Next, a second indicia layer 142 is formed over the first indicia layer 140 and, preferably, over only the first indicia layer and not the entire top surface 138. The second indicia layer 142 preferably consists of material that is transparent under visible light. As a result, when there is sufficient ambient visible light, the user is able to see the first indicia layer 140. The second indicia layer 142, however, reacts to UV light by emitting visible light. Thus, even in those instances where there is insufficient ambient visible light, the indicia 136 is visible as long as it is being irradiated by UV light. One example of a suitable material for the second indicia layer 142 is Invisible Ultraviolet High Visibility Bright Blue Fluorescing UV ink from LDP LLC in Woodcliff Lake, N.J. (www.maxmax.com), which is invisible under visible light and is ultra-bright under UV light.

Although the first indicia layer 140 in the exemplary embodiment described above is lighter than the key surface 138, the first indicia layer may also be darker than the key surface. If, for example, the key surface 138 is white, then a black first indicia layer could be used. Here, it would be preferable that the UV reactive material used for the second indicia layer 142 emit visible light in a color, such as blue, that contrasts with the white key surface.

Although the first and second indicia layers 140 and 142 may be formed by any suitable method, the preferred method is depositing the material for the layers using a silk screening process. Other methods of depositing the indicia layer materials include transfer printing, tampo printing and inkjet printing.

As illustrated for example in FIG. 5, indicia 136' may be formed on the key 134 by depositing a single indicia layer 144 of UV reactive material that is also visible under visible light. The color of the single indicia layer 144 should contrast with the color of the top surface 138 so that the indicia 136' can be seen under visible light. If for example, the key 134 is formed from a dark material, such as a black plastic, a suitable for the single indicia layer 144 is High UV Visibility/Low Normal Visibility UV ink from LDP LLC, which is green, purple, pink or yellow (depending on the ink selected) in color under visible light and which glows under UV light.

Another exemplary key, which is generally represented by reference numeral 134', is illustrated in FIGS. 6A and 6B. Here, the top surface 138 of the key 134' includes an indentation 146 and a layer of UV reactive material 148 is located within the indentation. The indentation 146 and UV reactive material 148 are both in the shape of the indicia 136" (e.g. an "S"). The color of the UV reactive material 148 (e.g. yellowish green) under visible light should contrast with the color of the top surface 138 (e.g. black) so that the indicia 136" can be seen under visible light. Here, a suitable UV reactive material is MaxLume material from LDP LLC.

The exemplary key 134' illustrated in FIGS. 6A and 6B may be formed by a variety of methods. For example, the key 134' may be formed by an injection molding process where the material that forms the main portion 150 of the key and the UV reactive material 148 are injected in separate steps. Either material can be injected first, depending on the type of injection molding process that is employed.

As illustrated for example in FIG. 1, the exemplary computer 100 includes a pair of UV light sources 152 that are mounted on the display housing 104. The UV light sources 152 direct UV light onto the keys 134, thereby making the indicia 136 visible in those situations where the ambient lighting from the visible portion of the spectrum is insufficient. Although the present inventions are not limited to any particular type of UV light sources, the preferred UV light sources are UV light emitting diodes or UV incandescent bulbs. Lenses (not shown) may be provided to focus the UV light onto the keys 134. Preferably, the user is able to activate the UV light sources 152 by pressing a button (not shown) on the main housing 102 or the display housing 104. Alternatively, a light sensor may be provided that automatically activates the UV light sources 152 when there is insufficient ambient visible light. Another alternative is to have an easily identifiable, pre-designated key on the keyboard activate the UV light sources 152. For example, the UV light sources 152 could be activated or deactivated when the space bar is depressed for 5 seconds. Additionally, because the UV light is not be visible to the user, the computer 100 (or other device) may be configured such that the UV light sources 152 is on whenever the device has been turned on.

The inventions herein are not limited to the dual UV light source arrangement illustrated in FIG. 1. For example, a single UV light source may be provided on the display housing 104 above, below or on either side of the display 112. A lens that focuses the light of the keys may also be provided where necessary. Alternatively, the main housing 102 may be provided with one or more UV light sources. The UV light source(s) may be fixed in place or, alternatively, may be pop-up or otherwise movable light sources that can deployed as necessary.

Although the present inventions have been described in terms of the preferred embodiments above, numerous modifications and/or additions to the above-described preferred embodiments would be readily apparent to one skilled in the art. By way of example, but not limitations, the present inventions have application in user interfaces other than those used in portable computers. Such applications include desktop computers, electronic devices that are intended to be used in low light or outdoor areas, automatic teller machines, printers and scanners. Also, fewer than all of the keys may include UV reactive indicia if desired. The user interfaces disclosed herein may also be used in conjunction with UV light sources that are not part of the host device. It is intended that the scope of the present inventions extend to all such modifications and/or additions.

We claim:

1. A device, comprising:
a housing including a user interface portion pivotably secured to a display portion;
a display supported by the display portion;
a user interface, supported by the user interface portion, including a plurality of keys, at least one of the keys including indicia formed at least in part from UV reactive material that emits visible light while being irradiated with UV light and stops emitting visible light when the UV light is removed; and
a UV light source associated with the housing such that UV light from the UV light source is directed onto the at least one key.

2. A device as claimed in claim 1, wherein the UV light source is carried by the display portion.

3. A device as claimed in claim 1, wherein a plurality of keys include indicia formed at least in part from UV reactive material.

4. A device as claimed in claim 1, wherein the at least one key comprises a relatively dark exterior and the indicia comprises relatively light material covered by the UV reactive material.

5. A device as claimed in claim 1, wherein the UV reactive material comprises UV reactive ink that is transparent under visible light.

6. A device as claimed in claim 1, wherein the UV light source comprises a light emitting diode.

7. A device as claimed in claim 1, wherein the UV light source comprises a pair of spaced UV light sources.

8. A computer user interface, comprising:
a plurality of computer keys arranged in a QWERTY layout or a DVORAK layout;
at least one of the computer keys including a surface, indicia material in the shape of indicia on the surface, and UV reactive material that emits visible light while being irradiated with UV light and stops emitting visible light when the UV light is removed covering the indicia material.

9. A user interface as claimed in claim 8, wherein a majority of the computer keys include a surface, indicia material on the surface in the shape of indicia, and UV reactive material covering the indicia material.

10. A user interface as claimed in claim 8, wherein the surface comprises a relatively dark surface and the indicia material comprises a relatively light material.

11. A user interface as claimed in claim 8, wherein the UV reactive material comprises UV reactive ink that is transparent under visible light.

12. A user interface as claimed in claim 8, wherein the UV reactive material covers substantially only the indicia material.

13. A user interface as claimed in claim 8, wherein
the indicia material reflects visible light; and
the UV reactive material is substantially transparent under visible light.

14. A computer, comprising:
a housing including a housing keyboard portion and a housing display portion pivotably connected to the housing keyboard portion and movable between open and closed positions;
a processor within the housing;
a keyboard, carried by the housing keyboard portion and operably connected to the processor, including a plurality of keys having indicia formed at least in part from UV reactive material that emits visible light while being irradiated with UV light and stops emitting visible light when the UV light is removed;
a display carried by the housing display portion and operably connected to the processor; and
a UV light source associated with the housing display portion such that UV light from the UV light source is directed onto the keys when the housing display portion is in the open position.

15. A computer as claimed in claim 14, wherein each of the keys comprises a relatively dark key and the indicia comprises relatively light material covered by the UV reactive material.

16. A computer as claimed in claim 14, wherein the UV reactive material comprises UV reactive ink that is transparent under visible light.

17. A computer as claimed in claim 14, wherein
the indicia is formed from indicia material that reflects visible light and the UV reactive material is formed over the indicia material; and
the UV reactive material is transparent under visible light.

18. A computer as claimed in claim 17, wherein the UV reactive material covers only the indicia material.

19. A device, comprising:
a housing;
a user interface, associated with the housing, including a plurality of keys, at least one of the keys including means for emitting light from a region in the shape of a predetermined symbol in response to the application of UV light thereto ending light emission when the UV light is removed and visibly displaying the predetermined symbol in response to the application of visible light thereto; and
means for directing UV light onto the means for emitting light, the means for directing being associated with the housing.

20. A device as claimed in claim 19, further comprising:
a display associated with the housing.

21. A device as claimed in claim 20, wherein the housing includes a user interface portion that supports the user interface and a display portion that supports the display.

22. A device as claimed in claim 21, wherein the light means is carried by the display portion.

23. A method of operating a device including a housing, the method comprising the steps of:
providing a user interface including at least one key having indicia formed from indicia material that is visible under visible light in the shape of indicia and UV reactive material that emits visible light while being irradiated with UV light and stops emitting visible light when the UV light is removed covering the indicia material;
directing UV light from a UV light source carried by the housing onto the at least one key.

24. A method as claimed in claim 23, wherein the step of providing a user interface comprises providing a user interface including a plurality of keys having indicia formed at least in part from UV reactive material.

25. A method of making a user interface, comprising the step of:
providing a key having a surface;
forming indicia on the surface from indicia material that is visible under visible light; and
depositing a layer of UV reactive material that emits visible light while being irradiated with UV light and stops emitting visible light when the UV light is removed over the layer of indicia material.

26. A method as claimed in claim 25, wherein the step of providing a key comprises providing a plurality of keys and the step forming indicia comprises forming a plurality of different indicia on the surfaces of respective keys from indicia material that is visible under visible light.

27. A method as claimed in claim 25, wherein the step of depositing a layer of UV reactive material comprises depositing a layer of UV reactive material that is transparent under visible light over the layer of indicia material.

28. A method as claimed in claim 25, wherein the step of depositing a layer of UV reactive material comprises depositing a layer of UV reactive material that is transparent under visible light over the layer of indicia material such that the UV reactive material covers only the indicia.

29. A device, comprising:
a housing;
a user interface, associated with the housing, including a plurality of keys, at least one of the keys including indicia formed from indicia material that reflects visible light and UV reactive material over the indicia material that emits visible light while being irradiated with UV light, stops emitting visible light when the UV light is removed and is transparent under visible light; and
a UV light source associated with the housing such that UV light from the UV light source is directed onto the at least one key.

30. A device as claimed in claim 29, wherein the UV reactive material covers only the indicia material.

31. A user interface, comprising:
at least two independently operably keys including respective key surfaces;
indicia material that is visible under visible light in the shape of indicia on each of the key surfaces; and
UV reactive material that emits visible light while being irradiated with UV light and stops emitting visible light when the UV light is removed covering the indicia material on at least one of the key surfaces.

32. A user interface as claimed in claim 31, wherein the UV reactive material comprises UV reactive ink that is transparent under visible light.

33. A user interface as claimed in claim 31, wherein the UV reactive material covers substantially only the indicia material.

34. A user interface as claimed in claim 31, wherein the key surfaces comprise relatively light key surfaces and the indicia material comprises a relatively dark material.

35. A user interface as claimed in claim 31, wherein the UV reactive material is substantially transparent under visible light.

36. A user interface as claimed in claim 31, wherein the indicia material is visible through the UV reactive material under visible light.

37. A user interface as claimed in claim 31 wherein the indicia material and the UV reactive material are different materials.

* * * * *

UNITED STATES PATENT AND TRADEMARK OFFICE
CERTIFICATE OF CORRECTION

PATENT NO. : 7,090,368 B2  Page 1 of 1
APPLICATION NO. : 10/133035
DATED : August 15, 2006
INVENTOR(S) : Glen A Oross et al.

It is certified that error appears in the above-identified patent and that said Letters Patent is hereby corrected as shown below:

In column 7, line 21, in Claim 19, after "thereto" insert -- , --.

In column 7, line 33, in Claim 22, after "the" delete "light".

Signed and Sealed this

Third Day of March, 2009

JOHN DOLL
*Acting Director of the United States Patent and Trademark Office*